United States Patent [19]

Schefczik et al.

[11] 3,963,747
[45] June 15, 1976

[54] BASIC ARYLMERCAPTONAPHTHOLACTAM DYES

[75] Inventors: Ernst Schefczik, Ludwigshafen; Klaus Grychtol, Bad Duerkheim, both of Germany

[73] Assignee: BASF Aktiengesellschaft, Ludwigshafen (Rhine), Germany

[22] Filed: May 30, 1974

[21] Appl. No.: 474,598

[30] Foreign Application Priority Data
June 2, 1973   Germany............................ 2328163

[52] U.S. Cl.......................... 260/326.27; 260/37 N; 260/247.1 L; 260/293.57; 260/293.59; 260/310 R; 260/326.28; 260/326.5 S; 260/326.62; 260/326.9
[51] Int. Cl.$^2$........................................ C07D 209/62

[58] Field of Search............ 260/313.1, 37 N, 326.9, 260/326.5 S, 326.5 SA, 326.27

[56] References Cited
UNITED STATES PATENTS

| | | | |
|---|---|---|---|
| 3,769,297 | 10/1973 | Brack et al. | 260/37 N |
| 3,853,911 | 12/1974 | Schefczik | 260/326.5 SA |

*Primary Examiner*—Paul M. Coughlan, Jr.
*Attorney, Agent, or Firm*—Johnston, Keil, Thompson & Shurtleff

[57] ABSTRACT

Basic dyes of the naphtholactam series substituted by an arylmercapto radical. The dyes are eminently suitable for dyeing anionically modified fibers, particularly acrylonitrile polymers, and give blue to blue green shades of excellent fastness properties.

5 Claims, No Drawings

BASIC ARYLMERCAPTONAPHTHOLACTAM DYES

The invention relates to dyes of the formula I

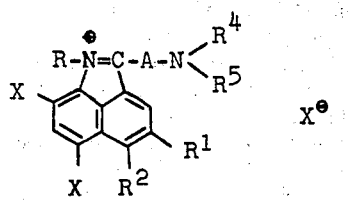

in which R is hydrogen or unsubstituted or substituted alkyl, cycloalkyl, aralkyl or aryl, $R^1$ is hydrogen, methoxy or ethoxy, $R^2$ is hydrogen or methoxy, one X is the radical of the formula —S—Ar and the other X is hydrogen, chlorine or the radical —S—Ar, or X and $R^2$ together are a radical of the formula

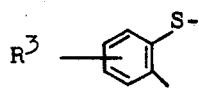

Ar is unsubstituted phenyl or naphthyl, $R^3$ is hydrogen, halogen, alkyl or alkoxy, $R^4$ is hydrogen or unsubstituted or substituted alkyl, cycloalkyl, aralkyl, or aryl, $R^5$ is unsubstituted or substituted alkyl, cycloalkyl or aralkyl, or $R^4$ and $R^5$ together with the nitrogen are the radical of a heterocyclic ring, A is unsubstituted or substituted p-phenylene or 1,4-naphthalene and $X^-$ is an anion.

Anions $X^-$ may be simple or complex inorganic or organic anions. Examples are chloride, bromide, nitrate, sulfate, methosulfate, ethosulfate, thiocyanate, formate, acetate, toluenesulfonate, tetrafluoroborate and tetrachlorozincate.

Alkyl R is in particular of 1 to 8 carbon atoms and can be substituted, for example by chlorine, hydroxyl, alkoxy, carbalkoxy, nitrile or acyloxy. Examples of substituents of cycloalkyl are alkyl groups and examples of substituents of aralkyl are halogen, alkyl and alkoxy.

Aryl can be substituted, for example by halogen, alkyl or alkoxy.

Examples of radicals R are: n- and i-propyl, n-butyl, hexyl, β-ethylhexyl, β-hydroxyethyl, β-hydroxypropyl, β-methoxyethyl, β-ethoxyethyl, β-methoxypropyl, β-ethoxypropyl, cyclopentyl, cyclohexyl, methycyclohexyl, benzyl, phenylethyl, p-methylbenzyl, methoxyphenylethyl, phenyl, chlorophenyl, methylphenyl, methoxyphenyl, ethoxyphenyl, and especially methyl, ethyl, β-cyanoethyl, β-carbomethoxyethyl, β-carboethoxyethyl and β-carbobutoxyethyl.

Examples of radicals Ar are phenyl, methylphenyl, methoxyphenyl, chlorophenyl, dichlorophenyl, bromophenyl, methylchlorophenyl, methoxychlorophenyl, carbalkoxyphenyl, phenylphenyl, aminophenyl and naphthyl.

Examples of radicals $R^3$ other than hydrogen are chlorine, methyl, methoxy and ethoxy.

Alkyl $R^4$ and $R^5$ are, in particular, of 1 to 4 carbon atoms, can be substituted like the radicals R, and may have the meanings given for R.

$R^4$ and $R^5$ together with the nitrogen are, for example, the radical of pyrrolidine, piperidine, morpholine or pyrazoline.

The radicals A can be substituted, for example by chlorine, methyl or methoxy.

In particular, the invention relates to a dye of the formula

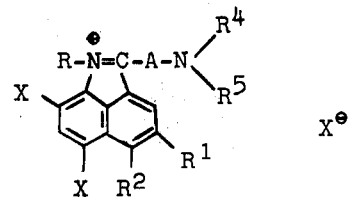

in which A is p-phenylene or 1,4-naphthylene, R is hydrogen, alkyl of 1 to 4 carbon atoms, hydroxyalkyl of 2 to 3 carbon atoms, cyanoethyl, carbamoylethyl, carbalkoxyethyl of 1 to 4 carbon atoms in the alkoxy or benzyl, $R^1$ is hydrogen, methoxy or ethoxy, $R^2$ is hydrogen or methoxy, one X is

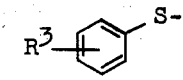

and the other X is hydrogen or chlorine, X and $R^2$ together are

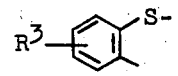

$R^3$ is hydrogen, chlorine, methyl, methoxy or ethoxy, $R^4$ is alkyl of 1 to 4 carbon atoms, chloroalkyl of 2 to 3 carbon atoms, cyanoethyl, benzyl, phenylethyl, cyclohexyl, phenyl, methoxyphenyl or ethoxyphenyl, $R^5$ is hydrogen, alkyl of 1 to 4 carbon atoms or chloroalkyl of 2 to 3 carbon atoms, $R^4$ and $R^5$ together with the nitrogen are pyrrolidino, piperidino, morpholino or 3,5,5-trimethylpyrazolino-1-$\Delta^2$ and $X^-$ is an anion.

Dyes of particular importance are those of the formula Ia or Ib

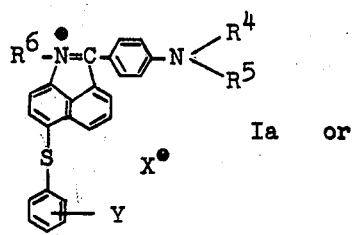

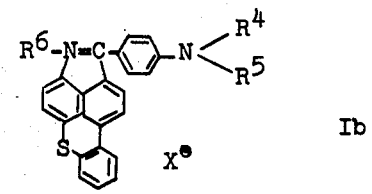

in which $R^6$ is methyl, ethyl, β-cyanoethyl or β-carboalkoxyethyl and Y is hydrogen, chlorine, methyl or methoxy, and $X^-$, $R^4$ and $R^5$ have the meanings given above.

Examples of preferred radicals $R^4$ and $R^5$ are methyl, ethyl, propyl, butyl, β-chloroethyl, β-cyanoethyl, β-methoxyethyl, β-ethoxyethyl, β-carbomethoxyethyl, β-carboethoxyethyl or βcabobutoxyethyl, benzyl, phenylethyl, phenyl, p-ethoxyphenyl, morpholyl or pyrazolinyl.

Dyes of the formula I can be manufactured by condensing compounds of the formula II

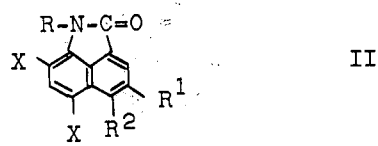

with compounds of the formula III

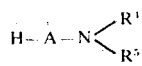

in the presence of agents which eliminate water.

If R = H, radicals R which can be introduced by means of alkylating agents, such as esters of strong acids, epoxides or acrylates, can also be introduced subsequently.

Examples of compounds of the formula II are: 4-arylmercaptonaphtholactam-(1,8), N-ethyl-4-arylmercaptonaphtholactam-(1,8), N-methyl-4-arylmercaptonaphtholactam-(1,8), N-β-chloroethyl-4-arylmercaptonaphtholactam-(1,8), N-β-ethoxyethyl-4-arylmercaptonaphtholactam-(1,8), N-methyl-4-α-thionaphthylnaphtholactam-(1,8), N-phenyl-4-arylmercaptonaphtholactam-(1,8), N-β-carbomethoxyethyl-4-arylmercaptolactam-(1,8), N-β-cyanoethyl-4-aryl-mercaptonaphtholactam-(1,8), N-ethyl-4-p-methoxyarylmercaptonaphtholactam-(1,8), N-methyl-4-p-chloroarylmercaptonaphtholactam-(1,8), N-β-cyanoethyl-4-p-methylarylmercaptonaphtholactam-(1,8), N-methyl-2-bromo-4-arylmercaptonaphtholactam(1,8), N-methyl-4-2′,4′-dichloroarylmercaptonaphtholactam-(1,8), N-benzyl-4-arylmercaptonaphtholactam-(1,8) and the compounds of the formulae

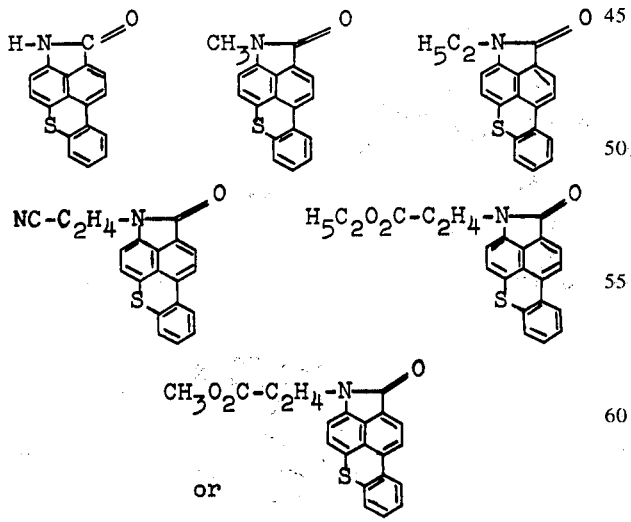

The manufacture of these compounds is described in U.S. Pat. application Ser. No. 378,222, now Pat. No. 3,853,911.

Examples of amines of the formula III are: N,N-dimethylaniline, N,N-diethylaniline, N,N-di-n-butylaniline, N-methyl-N-β-chloroethylaniline, N,N-dimethyl-2-methoxyaniline, N,N-dimethyl-3-chloroaniline, N-methyl-diphenylamine, N-methyl-4-ethoxydiphenylamine, 1-dimethylaminonaphthalene, N-phenylmorpholine, N-methyl-N-ethylaniline, N,N-dibenzylaniline, N-ethyl-N-β-cyanoethylaniline, N-ethyl-1,2,3,4-tetrahydroquinoline, 1-phenyl-3,5,5-trimethylpyrazoline-Δ² and 1-phenyl-3-methylpyrazoline-Δ²·

Examples of agents which eliminate water, or condensing agents, for use in the reaction of the compounds II and III are: Phosphorus oxychloride, phosphorus oxybromide, phosphorus trichloride, phosphorus pentachloride, thionyl chloride, phosphoric acid, polyphosphoric acid, phosphorus pentoxide or mixtures of these compounds. The addition of Lewis acids such as zinc chloride or tin tetrachloride to these condensation agents can be of advantage. An example of a method of carrying out the process is to heat the naphtholactam with the aromatic amine, with or without diluents, to from 50° to 170°C in the presence of the condensation agent. Preferred diluents are ethylene chloride, chlorobenzene, dichlorobenzenes and trichlorobenzenes.

If R = H, addition of alkali to the initially acid reaction solution gives the dye bases of the formula

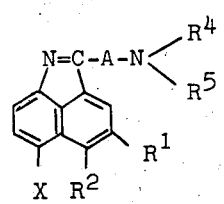

which can then be converted to the basic dyes of the formula I by treatment with quaternizing agents. Examples of quaternizing agents are dimethyl sulfate, diethyl sulfate, methyl iodide, benzyl bromide, p-toluenesulfonic acid ethyl ester, benzenesulfonic acid methyl ester, ethylene oxide, acrylonitrile, ethyl acrylate and acrylamide. The alkylation can be carried out, for example, in a melt of the components or in the presence of diluents, such as chloroform, ethylene chloride, dioxane, ethyl acetate, chlorobenzene, benzene, toluene, dichlorobenzene or glacial acetic acid, at temperatures from 20° to 170°C.

The compounds of the formula I are particularly suitable for dyeing, printing and spin-dyeing polymers ae acrylonitrile and of vinylidene cyanide, and acid-modified polyesters and polyamides. The dyeings and prints have very good fastness to light, decatizing and washing.

The products according to the invention have the advantage over known naphtholactam dyes without the arylmercapto substituents of exhibiting a valuable displacement of the color toward neutral blue and blue-green shades.

Unless stated otherwise, parts and percentages in the Examples which follow are by weight.

EXAMPLE 1

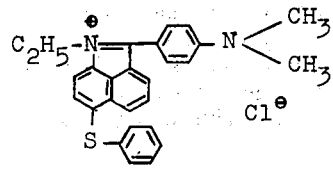

15 parts of N-ethyl-4-phenylmercaptonaphtholactam-(1,8) are introduced into a mixture of 58 parts of phosphorus oxychloride and 8.5 parts of phosphorus pentoxide. The mixture is heated to 80°C, 8.5 parts of dimethylaniline are then added dropwise in the course of 2 hours, and the whole is stirred for 3 hours at from 80° to 90°C. The mixture is decomposed by pouring into 300 parts of hot water and the pH is then adjusted to 1.5 with 50% strength sodium hydroxide solution. The dye which precipitates is filtered off and dried.

Yield 14.5 parts, melting point 198° to 205°C, with decomposition. The dye dyes polyacrylonitrile in neutral blue shades of good fastness properties.

If dimethylaniline is replaced by one of the anilines listed below and in other respects the procedure described is followed, blue dyes with similar properties are obtained: N-methyl-N-β-chloroethylaniline, N-ethyl-N-β-cyanoethylaniline, N,N-dibenzylaniline, N,N-dimethyl-m-toluidine, N,N-dimethyl-m-anisidine, N,N-dibutylaniline, 4-ethoxy-N-methyldiphenylamine, N-phenylmorpholine, diethylaniline and N-methyldiphenylamine.

EXAMPLE 2

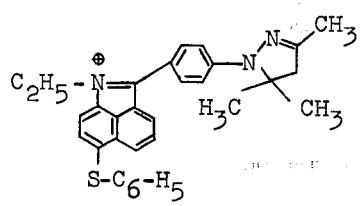

7.5 parts of N-ethyl-4-phenylmercaptonaphtholactam-(1,8), 25 parts by volume of ethylene chloride, 12.5 parts by volume of phosphorus oxychloride and 2 parts of anhydrous zinc chloride are stirred for 20 minutes at from 50° to 60°C. 5.6 parts of 1-phenyl-3,5,5-trimethylpyrazoline-$\Delta^2$ are then added dropwise and the mixture is heated under reflux for 5 hours. The dye is precipitated with ether and is purified further by dissolving it in hot water, filtering the solution using active charcoal, and finally reprecipitating the dye with NaCl-ZnCl$_2$ solution. 13 parts of a dye which dyes polyacrylonitrile greenish-blue are obtained.

EXAMPLE 3

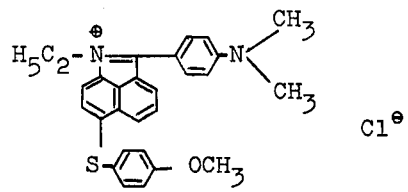

16.7 parts of N-ethyl-4-p-methoxyphenylmercaptonaphtholactam are reacted with 8.5 parts of dimethylaniline, as described in Example 1. The dye is obtained in good yield. On acrylonitrile polymer fabrics, the dye gives fast neutral blue shades.

Dyes with similar properties are obtained if dimethylaniline is replaced by one of the following amines: Diethylaniline, N-methyl-N-β-chloroethylaniline, N-ethyl-N-β-cyanoethylaniline, N,N-dimethyl-m-anisidine, dibutylaniline, 4-ethoxy-N-methyldiphenylamine, N-ethyl-N-benzylaniline, N-phenylmorpholine and N-methyldiphenylamine.

EXAMPLE 4

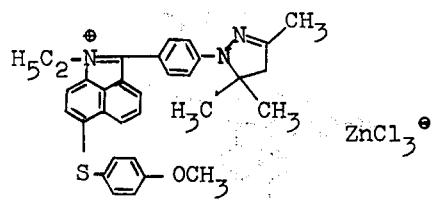

8.4 parts of N-ethyl-4-p-methoxy-phenyl-mercaptonaphtholactam are reacted with 5.6 parts of 1-phenyl-3,5,5-trimethylpyrazoline-$\Delta^2$ using the procedure of Example 2. 4 parts of dye which dyes polyacrylonitrile in greenish blue shades are obtained.

If the starting materials indicated in the table which follows are used and the same procedure is followed, neutral to greenish blue dyes are again obtained.

| Naphtholactam | Amine | Shade |
|---|---|---|
| NC–C$_2$H$_4$–N(lactam)–S–C$_6$H$_4$–OCH$_3$ | C$_6$H$_5$–N(CH$_3$)$_2$ | blue |
|  | C$_6$H$_5$–N(C$_2$H$_5$)$_2$ | greenish blue |
| H$_3$CO$_2$C–C$_2$H$_4$–N(lactam)–S–C$_6$H$_4$–OCH$_3$ | C$_6$H$_5$–N(CH$_3$)$_2$ | blue |
|  | C$_6$H$_5$–N(morpholino) | blue |
|  | C$_6$H$_5$–N(CH$_3$)–C$_6$H$_5$ | blue |
| H$_5$C$_2$O$_2$C–C$_2$H$_4$–N(lactam)–S–C$_6$H$_4$–OCH$_3$ | C$_6$H$_5$–N(CH$_3$)$_2$ | blue |

| Naphtholactam | Amine | Shade |
|---|---|---|
| | phenyl-N(C₂H₅)₂ | blue |
| | phenyl-N(CH₃)(C₆H₅) | blue |
| H₃CO₂C-C₂H₄-N-naphtholactam with SC₆H₅ | phenyl-N(CH₃)₂ | blue |
| | phenyl-N(C₂H₅)₂ | blue |
| | phenyl-N(CH₃)(C₆H₅) | blue |
| H₅C₂O₂C-C₂H₄-N-naphtholactam with SC₆H₅ | phenyl-N(CH₃)₂ | blue |
| | phenyl-N(C₂H₅)₂ | blue |
| NC-C₂H₄-N-naphtholactam with S-C₆H₅ | phenyl-N(CH₃)₂ | greenish blue |
| | phenyl-N(C₂H₅)₂ | greenish blue |
| | phenyl-pyrrolidine (2,2,4-trimethyl) | greenish blue |

EXAMPLE 5

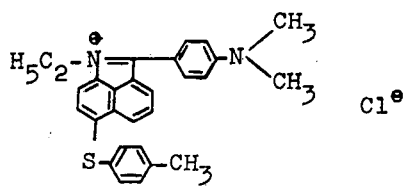 Cl⁻

16 parts of N-ethyl-4-p-methyl-phenyl-mercaptonaphtholactam are introduced into a mixture of 58 parts of phosphorus oxychloride and 8.5 parts of phosphorus pentoxide which is at 60°C. The whole is heated to 80°C and 8.5 parts of dimethylaniline are slowly added dropwise. After stirring for two hours at from 80° to 90°C, the mixture is poured into warm water and the pH is adjusted to 2 with 50% strength sodium hydroxide solution. The precipitate formed is separated off the dried. The dye gives brilliant neutral blue dyeings and prints and polyacrylonitrile fabrics.

If one of the amines listed below is used instead of dimethylaniline, netural blue to greenish blue dyeings are again obtained on polyacrylonitrile and acid-modified polyester and polyamide: Diethylaniline, N-methyldiphenylamine, N-phenylmorpholine, N-ethyl-N-benzylaniline, 4-ethoxy-N-methyldiphenylamine and N,N-dimethyl-m-anisidine.

EXAMPLE 6

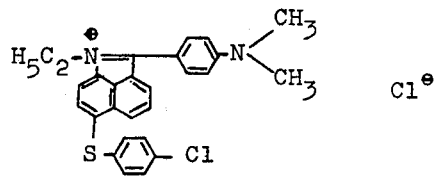 Cl⁻

9 parts of N-ethyl-4-p-chloro-phenyl-mercaptonaphtholactam are introduced into a hot mixture of 35 parts of phosphorus oxychloride and 5 parts of phosphorus pentoxide and 5.5 parts of dimethylaniline are added at 80°C. After stirring for 3 hours at from 80° to 90°C, the mixture is worked up in the usual manner. The dye shown above is obtained in good yield. It dyes polyacrylonitrile in a deep neutral blue.

If dimethylaniline is replaced by one of the amines listed below, dyes with similar properties are obtained: Diethylaniline, N-phenylmorpholine, N-methyl-4-ethoxydiphenylamine, N-ethyl-N-β-cyanoethylaniline, N-methyl-N-β-chloroethylaniline, 1-phenyl,3,5,5-trimethylpyrazoline-Δ² and N-methyldiphenylamine.

EXAMPLE 7

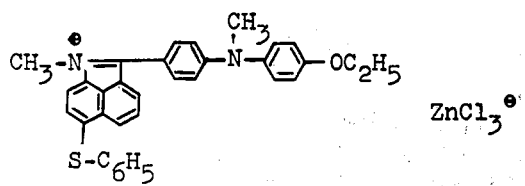

92 parts of phosphorus oxychloride are added dropwise to 100 parts of 4-phenyl-mercaptonaphtholactam and 88 parts of N-methyl-4-ethoxydiphenylamine in 400 parts by volume of chlorobenzene at from 80° to 90°C. After stirring the mixture for six hours, alkaline ice water is added and the solvent is distilled off in steam. The dye base which remains is dried and recrystallized from ethyl acetate. Yield 95 parts, melting point 138° to 140°C.

46 parts of the dye base are dissolved in 100 parts by volume of chlorobenzene and methylated at 90°C by dropwise addition of 15 parts of dimethyl sulfate. The organic solvent is stripped off in steam, the resulting dye solution is clarified with active charcoal and the dye is precipitated by salting out with a solution containing sodium chloride and zinc chloride. It produces a neutral blue dyeing on polyacrylonitrile.

Dyes with similar tinctorial properties are obtained from the following starting products:

| Naphtholactam | Amine | Shade |
|---|---|---|
| HN—C=O, S–C₆H₅ | ⌬-N(CH₃)(CH₃) | blue |
|  | ⌬-N(CH₂–C₆H₅)(C₂H₅) | blue |
|  | ⌬-N(C₄H₉)(C₄H₉) | blue |
| HN—C=O, S–⌬–OCH₃ | ⌬-N(C₂H₅)(C₂H₅) | blue |
|  | ⌬-N(CH₃)-⌬ | blue |
|  | ⌬-N O | blue |
|  | ⌬(OCH₃)-N(CH₃)(CH₃) | blue |

EXAMPLE 8

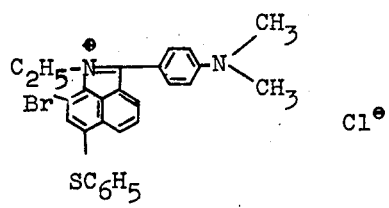

17.5 parts of N-ethyl-2-bromo-4-phenyl-mercaptonaphtholactam are introduced into 58 parts of phosphorus oxychloride and 8.5 parts of phosphorus pentoxide at 80°C. After adding 8.5 parts of dimethylaniline dropwise, the mixture is stirred at from 80° to 90°C for 8 hours, poured into water and buffered with sodium acetate solution. The dye is isolated by suction filtration; it produces a blue-green dyeing on polyacrylonitrile.

EXAMPLE 9

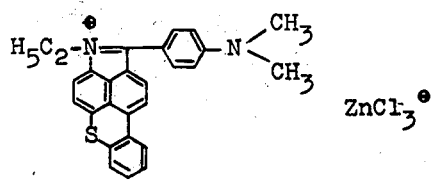

10 parts of the compound of the formula

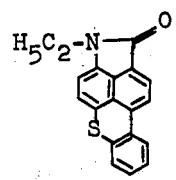

are introduced into a mixture of 50 parts by volume of phosphorus oxychloride and 5 parts of phosphorus pentoxide at 80°C. 5 parts of dimethylaniline are added dropwise at the same temperature and the whole is stirred for 4 hours. The mixture is then poured into water and buffered with sodium acetate. The dyeing which precipitates is purified by dissolving it in dilute hydrochloric acid, clarifying the solution with active charcoal, reprecipitating the dye by addition of a solution containing sodium chloride and zinc chloride, isolating it by suction filtration and drying it. 3.5 parts of the above compound, which gives a blue-green dyeing on polyacrylonitrile are obtained.

Dyes with similar properties are obtained with the components shown in the table which follows:

| Naphtholactam | Amine | Shade |
|---|---|---|
| 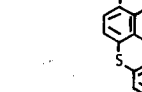 | 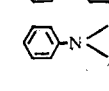 | blue-green |
| | 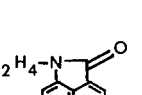 | blue-green |
| 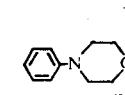 | 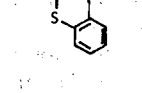 | blue-green |
| | 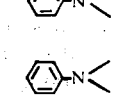 | bluish green |
| |  | bluish green |
|  | 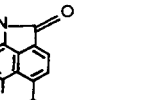 | blue-green |
| | 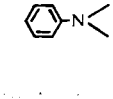 | blue-green |
| |  | blue-green |
| 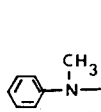 |  | blue-green |
| | 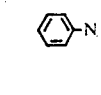 | blue-green |
| | 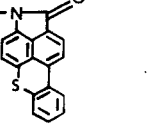 | blue-green |

We claim:
1. A dye of the formula

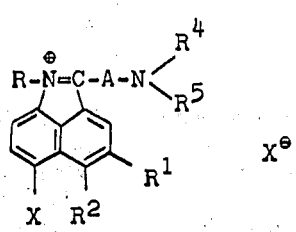

in which

A is p-phenylene or 1,4-naphthylene,
R is hydrogen, alkyl of 1 to 4 carbon atoms, hydroxyalkyl of 2 or 3 carbon atoms, cyanoethyl, carbamoylethyl, carbalkoxyethyl with 1 to 4 carbon atoms in the alkoxy or benzyl,
$R^1$ is hydrogen, methoxy or ethoxy,
$R^2$ is hydrogen or methoxy,
X is

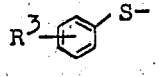

X and $R^2$ together are

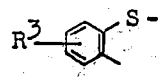

S being para to the nitrogen,
$R^3$ is hydrogen, chlorine, methyl, methoxy or ethoxy,
$R^4$ is alkyl of 1 to 4 carbon atoms, chloroalkyl of 2 or 3 carbon atoms, cyanoethyl, benzyl, phenylethyl, cyclohexyl, phenyl, methoxyphenyl or ethoxyphenyl,
$R^5$ is hydrogen, alkyl of 1 to 4 carbon atoms or chloroalkyl of 2 or 3 carbon atoms,
$R^4$ and $R^5$ together with the nitrogen are pyrrolidino, and
$X^-$ is an anion.

2. A dye according to the formula in claim 1 in which A is p-phenylene and the X ortho to the five-membered ring and $R^1$ are hydrogen.

3. A dye according to the formula in claim 1 in which R is methyl, ethyl, β-cyanoethyl or β-carbalkoxyethyl of 1 to 4 carbon atoms in the alkoxy.

4. A dye according to the formula in claim 1 in which $R^4$ is alkyl of 1 to 4 carbon atoms, β-cyanoethyl, benzyl, phenyl, methoxyphenyl or ethoxyphenyl, and $R^5$ is alkyl of 1 to 4 atoms.

5. A dye as set forth in claim 1 in which R is methyl, ethyl, β-cyanoethyl or β-carbalkoxyethyl of 1 to 4 carbon atoms in the alkoxy, $R^4$ is alkyl of 1 to 4 carbon atoms, β-cyanoethyl, benzyl, phenyl, methoxyphenyl or ethoxyphenyl, $R^5$ is alkyl of 1 to 4 carbon atoms, $R^2$ is hydrogen and X is

or X and $R^2$ together are

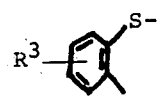

and $X^-$ is an anion.

* * * * *